Figure 1:
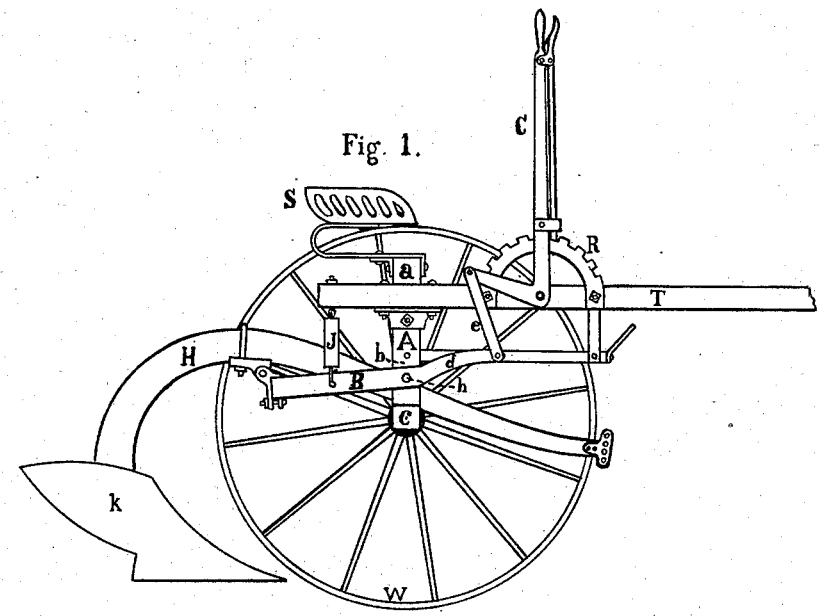

(No Model.)

W. B. YOUNG.
SULKY PLOW.

No. 255,557. Patented Mar. 28, 1882.

WITNESSES
William Sluyter
H. B. Hobart

INVENTOR
William B. Young
by John Lane
His Atty.

UNITED STATES PATENT OFFICE.

WILLIAM B. YOUNG, OF ALTON, ILLINOIS, ASSIGNOR TO THE HAPGOOD PLOW COMPANY, OF SAME PLACE.

SULKY-PLOW.

SPECIFICATION forming part of Letters Patent No. 255,557, dated March 28, 1882.

Application filed December 28, 1880. (No model.)

*To all whom it may concern:*

Be it known that I, WM. B. YOUNG, of the city of Alton, in the county of Madison and State of Illinois, have invented a new and useful Improvement in Sulky-Plows, of which the following is a specification.

My invention consists in certain improvements in sulky-plows, which will first be described, and afterward pointed out in the claims.

Referring to the drawings, like letters refer to like parts.

Figure 2:
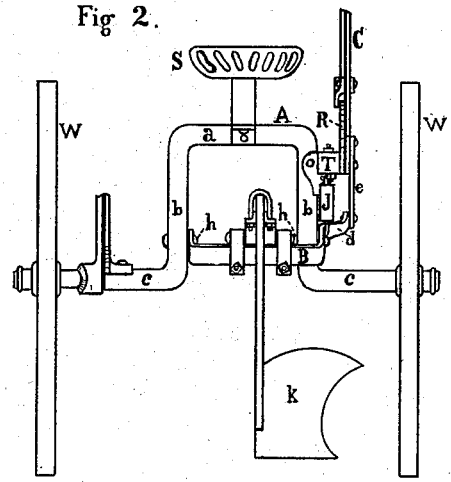
Figure 3:
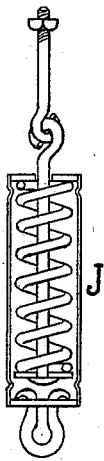

Figure 1 is a side elevation view, in which the wheel in the foreground is removed, showing my improvements. Fig. 2 is a rear view of same, and Fig. 3 is a view of the spring J.

A is the axle, elevated in the center $a$, with perpendicular sides $b$ and horizontal arms $c$, supported on wheels W, carrying a seat, S, and a tongue, T, constituting the frame.

B is a U-bail, having its two arms pivoted to the sides $b$, and having one arm, $d$, extending forward of the axle and connected by a link, $e$, with the lever C, and by the movement of the lever C the bail B is rotated on the pivots $h$, carrying the plow up or down. H is a plow-beam, carrying a plow, $k$, and having loose pivotal connection on the bail B, as shown.

All the above parts referred to by letter are of well-known construction.

J is a spring arranged to lift on the bail and counteract in a measure the weight of the plow. The spring J is of the kind known as "elastic link," and has one end connected to the bail and the other end connected to the frame or tongue, as shown. The spring J being of well-known construction, need not be here further described.

In operation the spring J, acting to rotate the bail B, exerts a continued pull, lifting upward on the plow to the extent of its power, and it may have sufficient power (or more) to balance the weight of the plow and beam, while the lever C and its lock-segment R hold the plow in any set position.

Having thus described my invention, what I claim, and desire to secure by Letters Patent, is—

1. In a sulky-plow, a central bail having pivotal connection with the axle, and an arm extending connecting by a link with the operating-lever, a plow mounted loosely upon said bail, and a spring acting upon the said bail in rear of the axle to elevate the plow, substantially as shown.

2. In a sulky-plow, the combination of an axle elevated in the center, with perpendicular sides and horizontal arms, one arm extending and having the wheel rotating thereon, a central bail having pivotal connection with the axle, and an arm extending connecting by a link with the operating-lever, a plow mounted loosely upon said bail, a spring having one end connected to the bail in rear of the axle and the other end connected above to the frame or tongue, and the spring acting upon the bail to elevate the plow, substantially as and for the purpose set forth.

WM. B. YOUNG.

Witnesses:
M. L. WARD,
J. R. RUNDON.